Aug. 23, 1966 K. G. BECHTIGER 3,268,166

MECHANICAL DIGITAL STORAGE DEVICE

Filed Oct. 13, 1964 6 Sheets-Sheet 1

INVENTOR
KARL G. BECHTIGER
BY [signature]
ATTORNEY

Aug. 23, 1966 K. G. BECHTIGER 3,268,166

MECHANICAL DIGITAL STORAGE DEVICE

Filed Oct. 13, 1964 6 Sheets-Sheet 2

INVENTOR
KARL G. BECHTIGER
BY
[signature]
ATTORNEY

INVENTOR
KARL G. BECHTIGER
BY [signature]
ATTORNEY

Aug. 23, 1966 K. G. BECHTIGER 3,268,166

MECHANICAL DIGITAL STORAGE DEVICE

Filed Oct. 13, 1964 6 Sheets-Sheet 4

INVENTOR
KARL G. BECHTIGER
BY [signature]
ATTORNEY

MECHANICAL DIGITAL STORAGE DEVICE

Filed Oct. 13, 1964

6 Sheets-Sheet 5

INVENTOR
KARL G. BECHTIGER
BY [signature]
ATTORNEY

INVENTOR
KARL G. BECHTIGER
BY [signature]
ATTORNEY

United States Patent Office 3,268,166

Patented August 23, 1966

3,268,166

MECHANICAL DIGITAL STORAGE DEVICE

Karl G. Bechtiger, Wurenlos, Aargau, Switzerland, assignor to Patelhold Patentverwertungs- & Elektro-Holding A.G., Glarus, Switzerland Filed Oct. 13, 1964, Ser. No. 403,487
Claims priority, application Switzerland, Oct. 15, 1963, 12,622/63
18 Claims. (Cl. 235—61)

The present invention relates to mechanical digital temporary storage devices, more particularly, though not limitatively, to a composite storage and encoding device for use in connection with the transmission or telemetering of the readings or indication of digital counters or meters, as required in the operation and supervision of electrical power distribution networks or the like transmission systems.

In the transmission of numerical values, such as of the readings of the electricity or the like counters or meters distributed throughout an electrical network, it is necessary to convert the reading of a master counter into an appropriate form, such as in the form of binary digit notation, suitable for transmission to a receiving or central station.

The converting devices used for the foregoing purpose are subject to extremely rigid requirements or specifications as regards operating safety, simplicity of design, as well as storage capacity.

There are already known transmitting devices of this type based on the transmission of digital pulse signals which, if required, such for instance as in the telemetering of counter readings, may be stored temporarily. Inasmuch as the existing pulse storage devices used for this purpose possess only a limited storage capacity, or will enable the storage of an insufficient number of pulses only, errors may occur in the indications or readings being transmitted upon exceeding of the maximum storage capacity by a preceding reading or transmission.

As a consequence, the known arrangements make it impossible in most cases to transmit the entire or absolute values of the readings, but rather require to limit the transmission to the difference between an existing and a previous value or reading being transmitted.

Accordingly, among the important objects of the present invention is the provision of an improved digital storage device of the referred to type which is substantially devoid of the above-mentioned and related defects and drawbacks inherent in the previously known devices and systems of this character; which will allow of the storage of an instantaneous counter or the like reading over practically any desired time period, substantially without involving any transmission errors; which will not interfere with the normal or continued operation or indication of the counter whose readings are to be transmitted; and which will allow of a subsequent storage and transmission immediately after completion of a preceding transmission or telemetering operation.

A more specific object of the invention is the provision of an integrated digital storage and encoding device, wherein the storage of a digital reading simultaneously causes the conversion into coded signals or pulses suitable for telemetering or transmission purposes.

Yet another object of the invention is the provision of a combined digital storage and encoding device, wherein a storage wheel or the like is utilized as an encoding element by cooperation with a stationary code plate, to result in a combined storage and encoding of a given reading by a single composite operation of the device.

The invention, both as to the foregoing and ancillary objects, as well as novel aspects thereof, will be better understood from the following detailed description, taken in conjunction with the accompanying drawings forming part of this specification and wherein.

Figure 3:
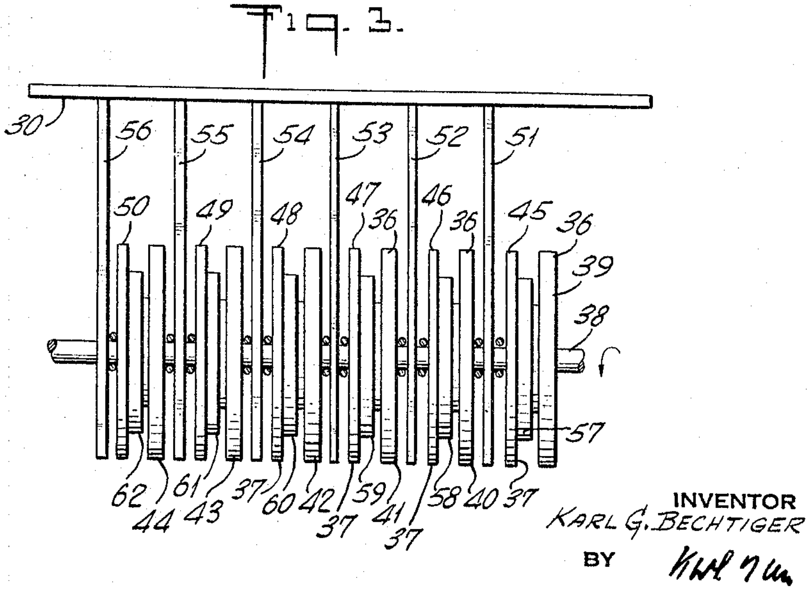
Figure 4:
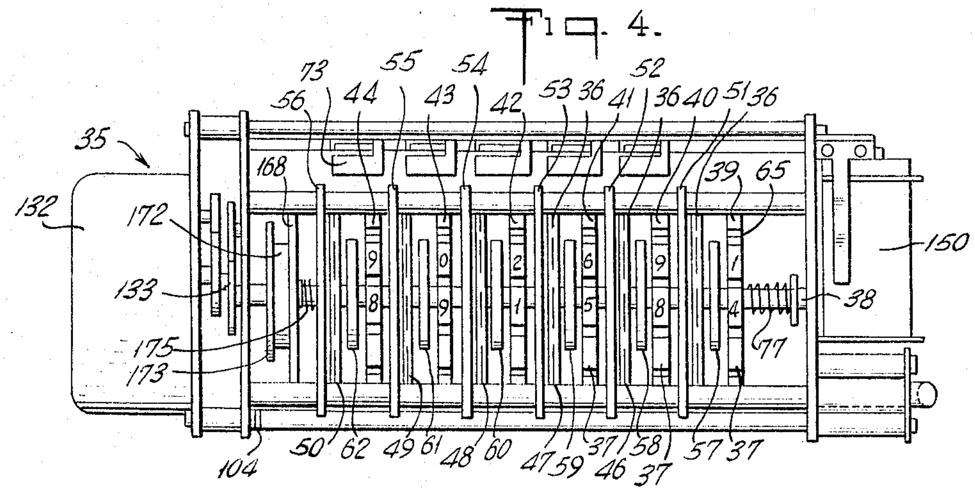
Figure 5:
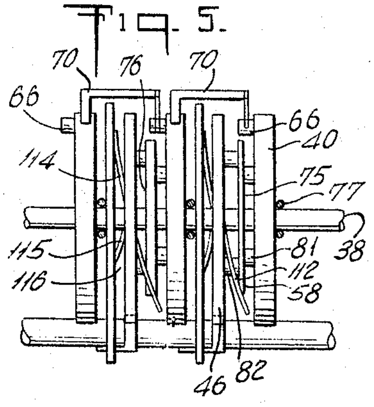
Figure 6:
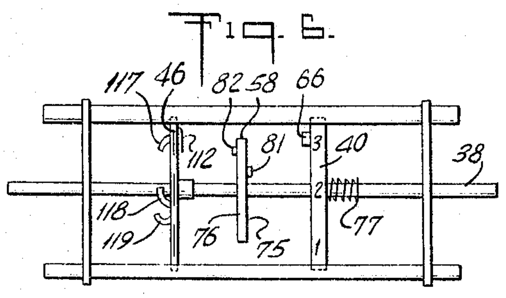
Figure 7:
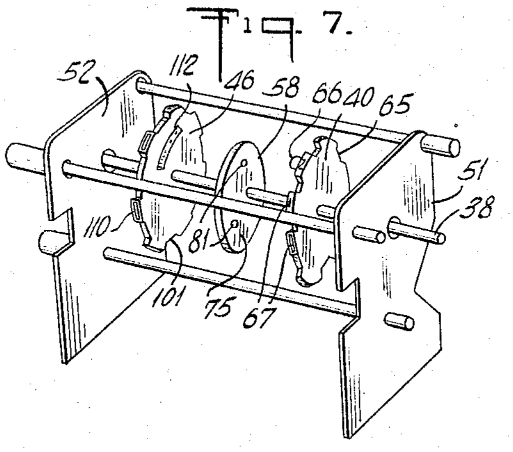
Figure 8:
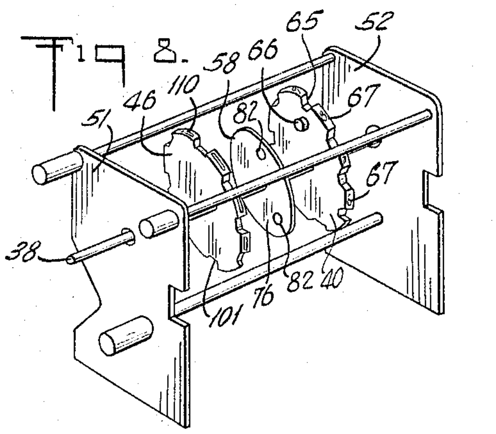
Figures 9, 10, 11, 12, 13:
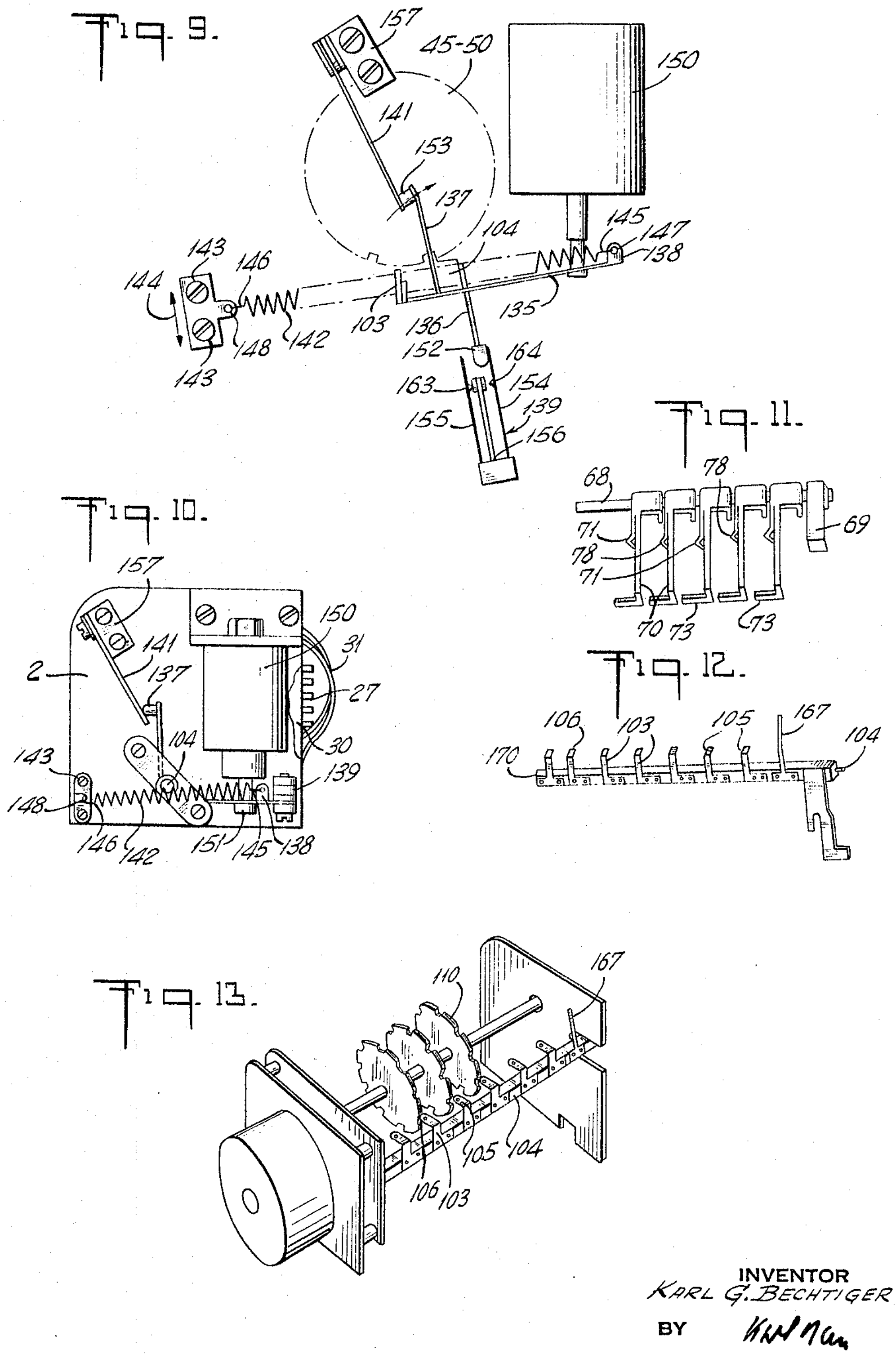
Figure 14:
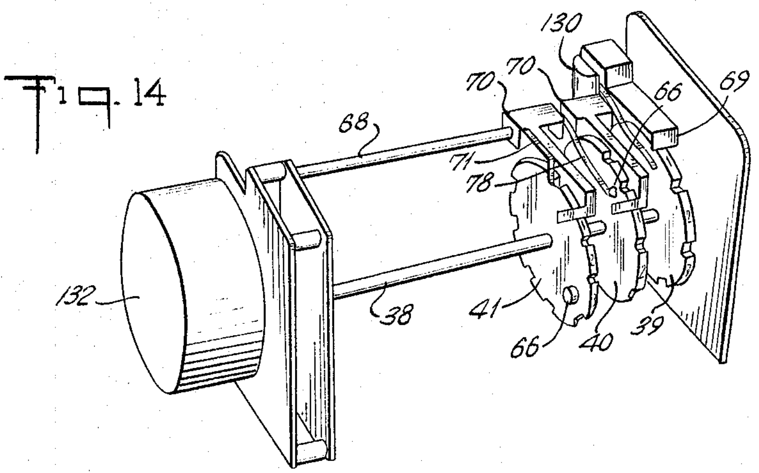
Figure 15:
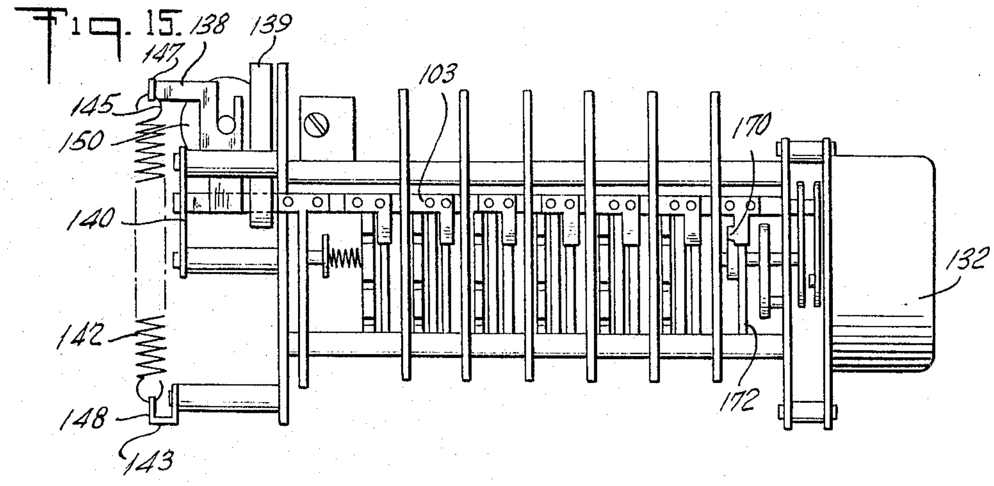
Figure 16:
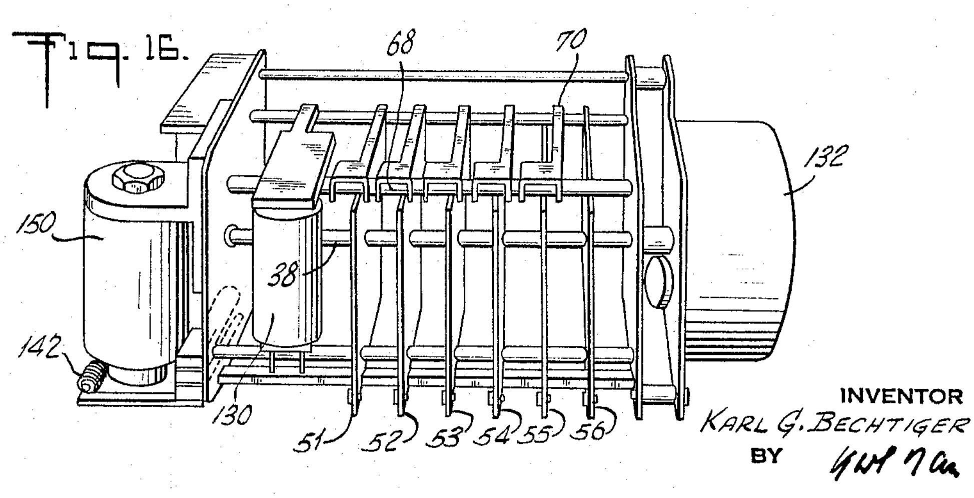
Figure 17:
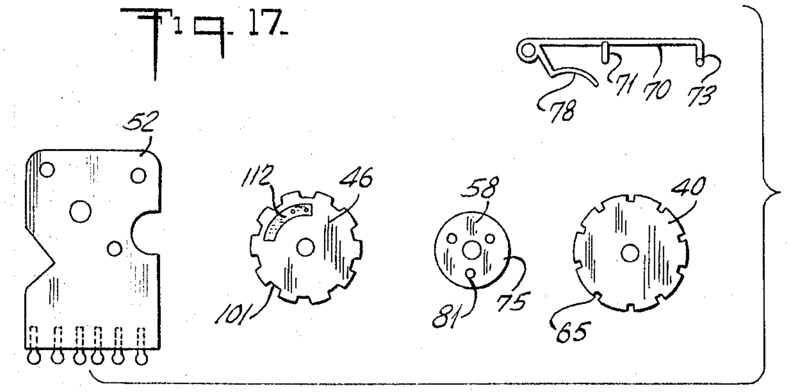
Figure 18:
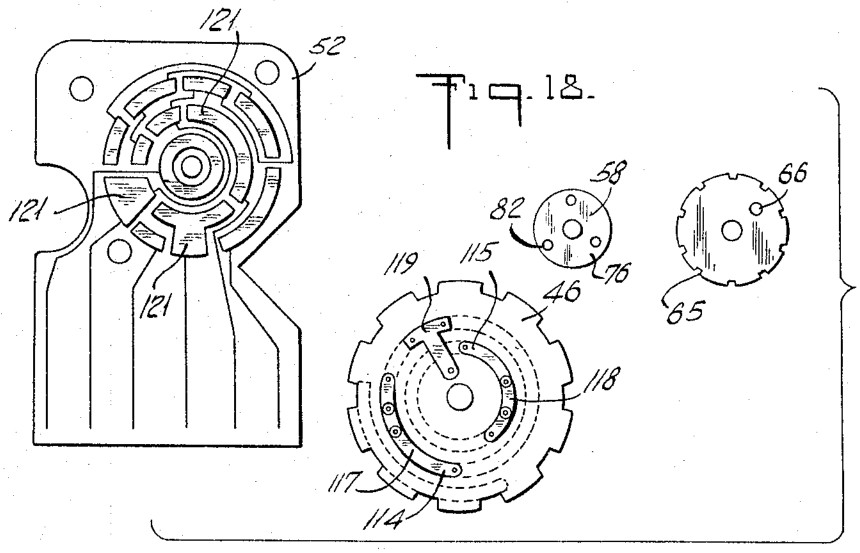
Figure 19:
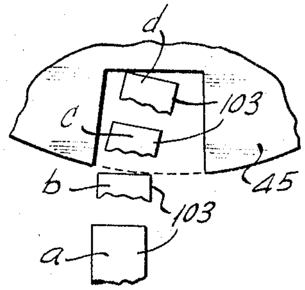
Figure 20:
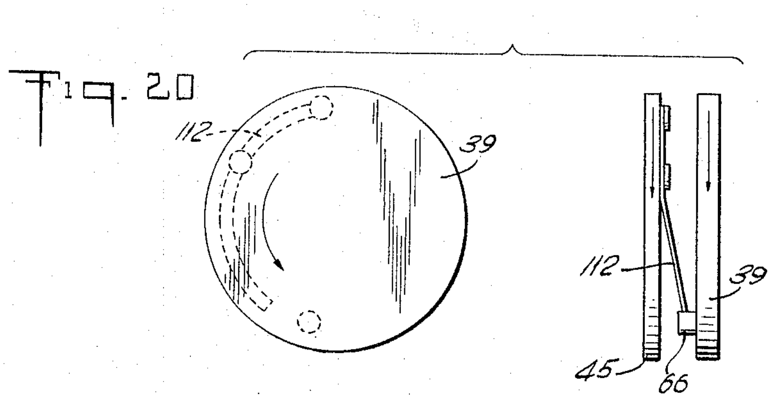
Figure 21:
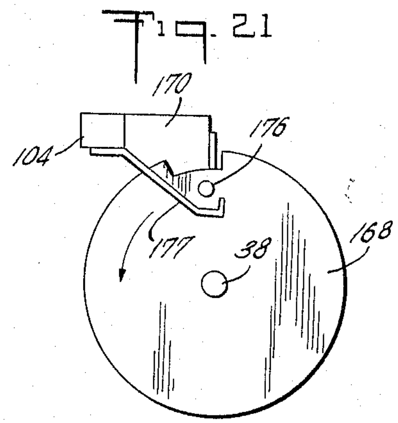

FIG. 3 diagrammatically shows the essential parts of a converter or encoder assembly according to the invention;

FIG. 4 is a front view of the encoder in the assembled condition, shown with the casing and the electrical operating parts removed;

FIG. 5 is a schematic fragmentary view of FIG. 4;

FIG. 6 shows a fragmentary decade section of FIG. 4 in expanded or "exploded" position of the parts;

FIG. 7 is a perspective view of the parts shown by FIG. 6;

FIG. 8 is a perspective view similar to FIG. 7 as seen from a different direction;

FIG. 9 is a schematic diagram of the electromagnetic control mechanism of the storing and encoding section of the device;

FIG. 10 is an elevation of the mechanism of FIG. 9;

FIG. 11 is a plan view of the feed or counting pawl aggregate of the device;

FIG. 12 is a plan view of the arresting or storing pawl aggregate of the device;

FIG. 13 is a perspective view, as seen from the driving side of the device, showing the storing or arresting pawl aggregate and contact or storage wheels in expanded position along the drive shaft of the device;

FIG. 14 is a perspective view similar to FIG. 13, showing the construction of the counting pawl aggregate and counting wheels;

FIG. 15 is a bottom view of the encoding device in the assembled position, shown with the housing removed;

FIG. 16 is a rear view of the device;

FIGS. 17 and 18 show, in plan view, various essential individual operating parts of the storage and encoding mechanism;

FIG. 19 illustrates various phases of engagement during the operation of an arresting pawl; and FIGS. 20 and 21 are further schematic views more clearly showing individual features embodied in the preceding figures.

Like reference characters denote like parts throughout the different views of the drawings.

With the foregoing objects in view, the invention involves generally the provision of a mechanical digital temporary storage device of the referred to type comprising essentially a pulse-controlled counting aggregate of notched decade counting wheels adapted to count continuously and sum up digital pulses, their sum corresponding, for instance, to an instantaneous reading of a digital numerical value, and the pulses being generated by said master counter, a similar aggregate of notched storage or contact wheels each being coordinated to a corresponding decade counting wheel of said first aggregate and a continuously rotating drive shaft with both the decade counting and storage wheels being freely rotatively mounted upon said shaft. There are further provided in accordance with the invention a plurality of friction coupling disks being fixedly secured to said shaft in mutually spaced relation and fitted with means to maintain the opposite faces of each disk in resilient frictional coupling engagement with a coordinated pair of decade counting and storage wheels, respectively, whereby said shaft normally tends to rotate all said wheels through said disks. In order to effect counting of the pulses applied to the first or unity stage or wheel of the counter, such as by means of a control electromagnet, the counting wheels are normally locked against rotation by the provision of suitable feed or counting pawls normally engaging the notches of the wheels, the wheels being intermittently or temporarily released by the counting control pulses applied to the pawl of the first stage and by the carry pulses transmitted from stage to stage, to count and display the applied decimal number or instantaneous counter readings, in a manner well known in the operation of digital counting devices of this type.

There is further provided, in accordance with the present invention, additional coupling or follower means operably frictionally engaging the associated decade counting and storage wheels, in such a manner as to automatically maintain the storage wheels in synchronized position with the respective counting wheels, while allowing of relative rotation in the out-of-step position of the wheels by virtue of the associated coupling disks, in such a manner as to result in the automatic synchronization of the coordinated counting and storage wheels, as will become further apparent as the following description proceeds.

Finally, the invention calls for the provision of further individual arresting means adapted to cooperate with the notches of the storage wheels, said arresting means arranged for simultaneous or uni-control by a received "read and store" or order pulse, whereby to arrest all the storage wheels in a desired position, corresponding to an instantaneous reading of the counter to be stored and transmitted, after suitable conversion or encoding into binary or other types of signal pulses.

Advantageously, the storage wheels are designed as component parts of an encoding device cooperating with a fixed or stationary code plate, to directly produce suitable encoded output signals by the device. A combined digital storage and encoding device of this type is shown by the drawings, by way of example, and described in detail in the following.

There is thus provided by the invention a fully coded pulse output signal representing a counter or the like reading which may be transmitted decade by decade. Inasmuch as transmission of a greater number, such as several hundreds of readings, requires even in the case of a high speed transmission link and limited transmission bandwidth, a transmission time of at least several minutes, it is necessary to comply with requirements for "simultaneity" of transmission by a "read and store" operation at the stations or locations of the counters. This function is performed by the primary encoder or combined storage and encoding device associated with each counter whose readings are to be transmitted. The function of the transmission system or link consists in sending out the "read and report" orders, or to interrogate the respective meters or stations of the system. In order to further maintain a condition of simultaneity in cases of a great number of groups of stations, interrogation may be effected in two stages, viz., by first sending the orders to the individual stations from the central station, to effect a temporary storage of the various readings or information desired. The resulting time delay will be minimal, being of the order of a few seconds only in the case of ten stations called. Subsequently, the central station sends out the orders for the transmission of the information or readings stored, starting with the first station and continuing with the second, third, etc., station, until all of the desired and stored information has been received.

Figure 1:
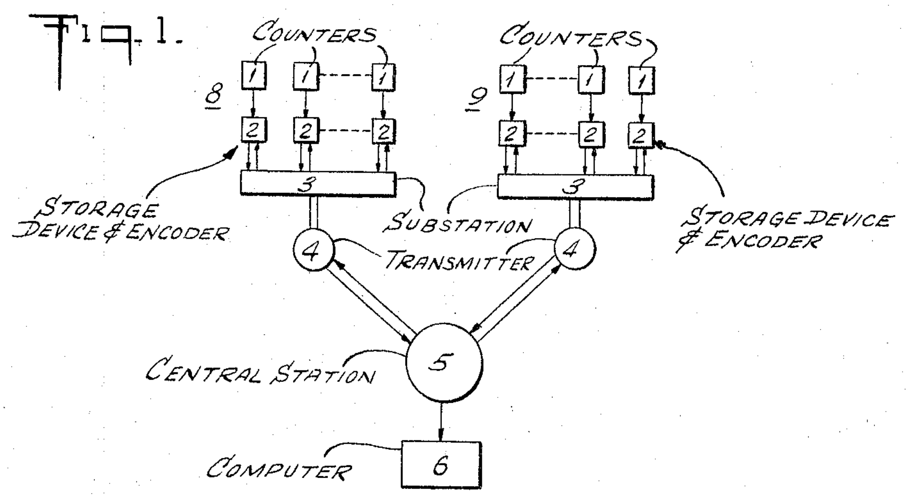
FIG. 1 is a block diagram illustrating, by way of example, a complete transmission system for the telemetering of counter or the like digital readings or values.

Referring more particularly to FIG. 1 of the drawings there is shown, by way of example, a general layout of a meter or counter reading telemetering or transmission system or the like. Each station where a reading is to be taken comprises a master counter 1, generating digital pulses the sum of which represents an instantaneous numerical value or reading, to which is connected a signal storage and converter 2, referred to as primary encoder in the following, said encoder being in turn connected to an exchange or substation 3. The latter is, in turn, connected to a transmitter 4 which cooperates with the receiver or central station 5 through a suitable transmission link, the receiver serving to operate a suitable output device, such as an electronic computer 6 or the like.

In the example shown, there are provided two subgroups or systems 8 and 9 each comprising a number of master counters 1, it being possible to increase the number of subgroups for the processing by a single computer of great numbers of counter readings or the like digital values.

When it is desired to read a master counter 1, an order pulse is transmitted from the central station 5 to the transmitter which in turn feeds said pulse to the associated encoder switching or substation 3. Upon the arrival at a primary encoder 2 of an order for the transmission of the reading of the associated master counter a number of operations will be set in motion as described in the following.

The primary encoder 2, at the instant of receiving a "read and report" order, at first picks up and stores the instantaneous reading of the respective master counter 1, to subsequently transmit the same via the substation or exchange 3 to the transmitter 4 and from there to the receiver 5, the output of which is in turn applied to the computer or other output device 6.

The counters to be serviced may be subdivided into smaller or larger groups which may be spaced by substantial distances from each other. Furthermore, it is possible to transmit the readings to a single central station either in groups or for selected counters only, as the case may be. The orders for such a transmission may be sent out from the central station according to a prearranged schedule or program or at random and manually. The transmission system may be in the form of any suitable pulse transmission or telemetering link or path including auxiliary devices for the transmission of the counter or the like readings. Advantageously, the readings are transmitted in the form of binary coded signals or pulse in the interest of a distortion-free transmission, in a manner well known and understood.

The individual digits of the readings stored may be transmitted in succession and displaced for instance at the receiver side-by-side, or applied to the computer or the like output device, as the case may be.

Figure 2:
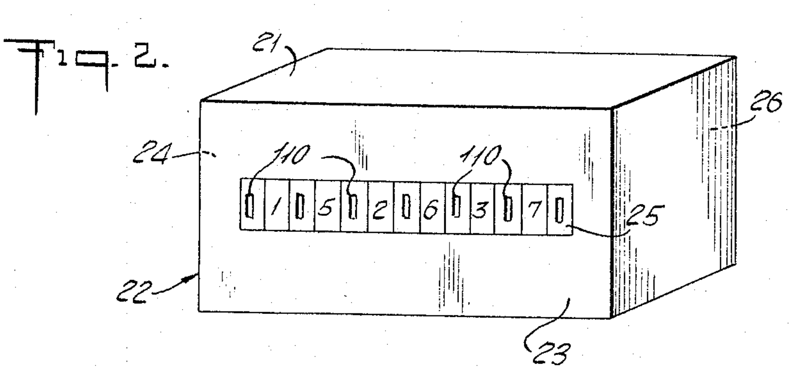
FIG. 2 shows the exterior of a converter or combined storage and encoding device according to the invention, suitable for use in a system of the type according to FIG. 1.

The primary encoder 2, FIG. 2, may be mounted within a steel casing 21 for use in connection with switchboard instruments. The front 22 of the casing 21 is covered, in the example shown, by a glass plate 23 to the inside of which is applied an aluminum or the like mask 24 having an opening or window 25 to reveal the instantaneous reading of the encoder, in the manner further understood from the following. Disposed upon the rear side 26 of the casing 21 may be the electrical connecting terminals 27, FIG. 10, by means of which the encoder is connected with the associated counter 1 and the data transmission circuits or system. Further disposed upon a cover plate 30 of the casing, FIG. 3, may be the entire electrical wiring of the encoder including the electronic circuits required for the information transmission, being preferably in the form of printed circuits, to substantially avoid errors or interruptions due to defective soldering contacts as well as to reduce the manufacturing costs.

The mechanical parts 35 of the encoder, FIGS. 3 and 4, consist essentially of six, in the example shown, counting and storing wheel aggregates 36 and 37, respectively, being loosely mounted upon a common continuously rotated drive shaft 38 and coupled with each other in the manner described in the following. The arrangement of the wheel systems 36 and 37 is more clearly shown by the simplified schematic diagram according to FIG. 3 of the drawings. Referring to the latter, the wheel aggregates, according to the example shown of a six digit decade counter, each comprise six notched counting wheels 39–44 and six equally notched contact or storing wheels 45–50, respectively. Correlated to and cooperating with each storing wheel 45–50 is a fixed code plate 51–56 which may be directly electrically connected with the printed circuit upon the cover plate 30. Disposed between each counting wheel 39–44 and its coordinate storing wheel 45–50 is a follower or coupling disk 57–62 fixedly mounted upon the shaft 38. In other words, each decade stage, as shown by FIGS. 3 and 4, consists of a counting wheel 39–44, a storing wheel 45–50, an associated code plate 51–56 and a coupling 57–62, respectively.

FIG. 5 shows two counting stages in the principal construction. Inasmuch as all six stages are identical, except for slight deviations of the first and last stage, only a single stage (counting wheel 40) will be referred to in the following description.

The counting wheel 40 (see also FIGS. 6–8) is provided upon its periphery with ten equally spaced notches 65 adapted to be engaged by a feed or counting pawl 70, FIGS. 5 and 14. The wheel 40 is further provided with a coupling and carry pin 66 and has applied to its peripheral edge surface and between the notches 65 the numerals or decimal digits from zero to nine rendered conspicuous for easy reading by suitable coloring. These numbers, representing the meter reading, appear in the window 25 of the mask 24 in the front of the encoder, FIG. 2, whereby to enable a direct ascertainment of the instantaneous meter or counter reading. As pointed out, the wheel 40 is mounted to rotate freely upon the shaft 38, FIGS. 4–8, and is resiliently pressed against its associated coupling disk 58 by the action of a coil spring 77, FIGS. 5 and 6, loosely encircling said shaft. The disk 58, in the example shown, is fitted on its opposite faces with projections 81 and 82, FIGS. 17 and 18, consisting advantageously of a synthetic material of high resistance against surface wear, high demensional stability, low hygroscopicity, and having a friction coefficient which remains constant over prolonged periods, while being able to be worked readily by a machining tool. Such a material is known, for instance, under the trade name "Delrin." The function of the disk 58 is to couple the wheels 40 and 46 by friction, in the manner shown and understood. Inasmuch as the counting wheel 40 requires a smaller coupling torque than the storage wheel 46, and since the pressure by the spring 77 is the same for both said wheels, there results therefrom the special design of the disk 58 as shown. In the example shown, the two faces of the disk are each fitted with three coupling projections or pins 81 and 82 which are uniformly distributed over a concentric circle with the pins upon the face 75 being located upon a smaller circle and with the pins upon the face 76 being located upon a larger circle, to adapt the driving torques to the special requirements pointed out. The projecting end surfaces of the pins act as friction coupling surfaces between the wheels 40 and 46.

It is possible, however, to replace the coupling pins 81 and 82 by circular or the like coupling surfaces of appropriate width and diameter, respectively, to effect matching with the difference in torques being transmitted.

The storage wheel 46 is also loosely mounted upon the shaft 38 and is pressed against the coupling disk 58 by the spring 77. Wheel 46, in the same manner as wheel 40, is provided upon its periphery with spaced notches 101 adapted to be engaged by an arresting pawl 103, FIG. 13. In order to identify the position of the wheel 46, in a manner similar as in the case of wheel 40, wheel 46 is further provided upon its periphery with suitable identifying marks located between the notches 101 and shown in the form of suitably colored grooves or lines 110 in the example illustrated. The colors of the lines 110 may advantageously vary for the ten digits shown, such as in accordance with the international color code as used for the identification of electrical resistors, capacitors and the like. Thus, for instance, position zero may be marked by the color black, the unit digits may be marked brown and so forth, these colored markings being also visible through the window 25 of the encoder, FIG. 2. The use of coloring for the marking or indication of the position of the storing wheels 45–50 eliminates confusion with the indication of the counting wheels 39–44. The disadvantages of the more difficult reading of the color markings of the wheels 45–50 is only apparent, inasmuch as the positions of the wheels 45–50 have to be ascertained only during testing and searching for faults of the device. For ordinary use, it is advantageous that the indication of the position of the storage wheel is less conspicuous, or readable, in that the reading of two juxtaposed and intercalated multi-digit numbers is avoided in this manner.

Secured to the storage wheel 46 is a segmental running up or braking spring 112 which serves to brace said wheel against the correlated counting wheel 40 by way of the coupling pin 66 in the synchronized position of the wheels. Spring 112, in order to provide a coupling force by the pin 66 being in excess of the coupling force provided by the disks 57–62, is so designed as to exhibit a substantial stiffness both in the longitudinal direction, or tangentially to the periphery of the wheel 46, as well as in the crosswise direction, or radially to the wheel 46, but to be extremely yielding in the direction parallel to the shaft 38, for the reasons set forth hereafter and becoming further apparent as the description proceeds. The storage wheel 46 is furthermore fitted on the side opposite to the coupling disk 58, FIG. 18, with three contact springs 117–119 secured by riveting or the like and carrying at their free ends contact points 114–116 which are preferably coated with a layer of gold or an equivalent contact metal. The springs 117–119 are so constructed as to exhibit a high stiffness in the direction parallel and radial to the wheel 46, and to exhibit a relatively low but predetermined stiffness in the direction parallel to the shaft 38. As a consequence, there is ensured in this manner an exact guidance of the contact points 114–116 along paths being concentric with the shaft 38, the pressure against the code plate 52 being maintained within a narrow tolerance range. As will be described later on, the storage wheel 46, depending upon the operating position of the primary encoder 2, may be either stationary or rotating with the shaft 38. On the other hand, the code plate 52 remains always stationary, whereby the contact points 114–116 slide upon the coordinated segments 121 of said plate, to result in the automatic encoding of the instantaneous readings of the wheels 39–44.

The code plate 52, FIG. 18 may consist of a fiberglass or the like base provided with an etched copper coating, to leave a circuit pattern in the form of circular segments 121 concentric to the shaft 38. The electrical connections of the segments with each other and with their connecting leads may be integrated in the printed circuit. More specifically, the segments 121 are distributed in such a manner as to cause the three contact points 114–116 of the storage wheel 46 to slide upon said segments, in such a manner as to correlate, depending upon the position of the wheel, predetermined ones of said segments with each other and the output terminals of the code plate 52, and to thereby provide an electrical or coded image of the position or reading of the wheel 40 at said terminals. In other words, the position of the wheel 40 is coded by the contact segments 121 of the plate 52. The contacts of the code plates may be monitored electronically without difficulty and in a manner well known.

The feed pawls 70, FIG. 14, interconnect each two succeeding counting wheels 40–44, the individual pawls being substantially independent of each other. Each pawl 70 has a locking bar 71 adapted to engage one of the notches 65 of the coordinated counting wheel 40–44, to normally prevent rotation of the wheels. Thus, for instance, if the second pawl 70 is raised out of a notch 65, the corresponding counting wheel 40 is set in motion or rotated by way of the coupling disk 58. More particularly, upon release of the pawl 70, the latter presses slightly, by virtue of its own weight, upon the coordinated rotating counting wheel 40. The resulting braking force upon the counting wheel is negligibly small compared with the driving forces involved. As a consequence, the counting wheel 40 continues to rotate until the notch 65 passes underneath the pawl 70, thereby enabling the pawl 70 to descend and to positively arrest the wheel in locking engagement therewith. In other words, the counting wheel 40 may be arrested only at positively determined points corresponding to notches 65 of the wheel 40. With the wheel being at rest, the friction energy produced by the associated rotating coupling disk 58 is converted into heat, the latter being however so small as to preclude any permanent changes of the materials.

Besides the bar 71, the feed pawl 70 (see also FIG. 17) or those pawls whose bars 71 serve to arrest the counting wheels 40–44, possess a depending finger 78 which is lifted once during each rotation of the preceding counting wheel by the pins 66. The latter and the finger 78 of the feed pawl 70 are correlated in such a manner that the finger 78 is lifted during transition of the preceding counting wheel from the counting position nine to the position zero. As a consequence, the bar 71 of the next following counting wheel is lifted in the manner described, whereby to allow said wheel to advance by one unit or count and to effect the carry transfer from a lower to the next higher decade of the counter, in the manner readily understood. The circular segmental shape of the finger 78 (theoretically of parabolic shape) makes it possible to reduce the work performed by a preceding counting wheel to a minimum and to distribute it equally over the rotational angle involved. The pawl 69 of the first or input stage whose bar 71 cooperates with the first counting wheel 39, is devoid of a lifting finger 78, since the counting wheel 39 has no wheel preceding the same in the counting aggregate.

The pawl 69, FIG. 14, of the input stage is actuated by a small electromagnet 130, the arrangement being such that the pawl is in the raised position during the energization of the magnet. In order to adjust the counting wheels 40–44 in a simple manner from the outside of the casing 21, FIG. 2, all the pawls 70, except the first pawl, possess a small extension 73, FIG. 17, terminating at a point close to the inside of the glass plate 23 closing the front of the encoder 2. The pawls 70 consist of magnetic material, whereby to enable their raising and lowering from the outside by the aid of a small permanent magnet, in an effort to adjust or set the encoder at any time to a desired position or reading without opening of the casing. As a consequence, the encoder may be enclosed and sealed in a dust-free casing.

The six feed pawls 69, 70 are all mounted upon a common axis or shaft 68 in juxtaposed position so as to be able to rotate freely and independently upon said shaft. The operation of the device is continuous in the sense that a continuously rotating synchronous motor drives the shaft 38 together with the coupling disk 57–62, whereby rotation of the counting wheels 39–44 and storage wheels 45–50 is enabled only upon release of the respective pawls by the control operations or pulses as described. The magnet 130 serves for the actuation of the first feed pawl 69, whereby to enable, upon the application of the counting pulses to said magnet, the counting wheel 39 to be advanced by one step or count, in the manner of known digital counters of this type. The magnet 130 may be actuated by the short-circuiting of two leads or conductors passing from the cover plate 30 to the outside. The operating voltage source may be the same as that used for the operation of the synchronous motor 132. For reasons of safety, it is advantageous to use the same source which serves to drive the associated master counter 1. In this manner an exact and positive synchronism may be ensured between the master counter 1 and the operation of the encoder 2, since both devices either operate simultaneously or are arrested, such for instance as during a short circuit or upon disappearance of the operating voltage.

By the described construction of the primary encoder 2 it is furthermore possible to convert a substantially constant and relatively small input power into the required step-by-step operations with a high electromagnetic efficiency, inasmuch as the synchronous motor 132 assumes the entire driving load and the magnet 130 is called upon to release the first feed pawl 69 of the device only. Besides, the release of the pawl 69 always requires the same relatively small control force, irrespective of whether the first counting wheel only or all six counting wheels 39–44 together with their coordinated storage or encoding wheels 45–50 are to be set in motion at the point of transition from the 999999 to the 000000 counts or positions of the device.

Arresting pawls 103 are coordinated with the storage wheels 45–50, each of the latter possessing its own arresting pawl 103, FIG. 13. The function of the arresting pawls 103 in cooperation with the storage wheels 45–50 is the same as that of the feed pawls 69 and 70 cooperating with the counting wheels 39–44, that is, to arrest the storage wheels in locking engagement with the notches 101. In contrast to the feed pawls 69 and 70, all six arresting pawls 103 are mounted fixedly upon a control shaft or axis 104, in such manner that 11 of the pawls 103 may be raised and lowered simultaneously, or in unison. This operation is essential for the proper functioning of the primary encoder 2. The arresting pawls have only a single bar 105 and there is provided a common operating mechanism for the actuation of all the six pawls 103 in a manner described in greater detail in the following. In the raised position of the pawls 103, all the storage wheels 45–50 may rotate freely, said wheels receiving their driving torque by friction from the coupling disks 57–62 sliding upon said wheels under pressure provided by the spring 77. The shaft 38 together with the six coupling disks 57–62 is driven by the synchronous motor 132 through a two-stage precision gearing 133, FIG. 4, the speed of rotation of the shaft 38 being 20 r.p.m., that is, corresponding to one complete revolution of the shaft during each three seconds. Inasmuch as the entire arresting pawl aggregate necessarily possesses a greater mass than a single feed pawl 69 or 70, both the static and driving forces for the arresting pawl aggregate are greater than for the feed pawl aggregate of the device. It is possible that a single contact wheel prevents the engagement of the entire pawl aggregate, that is, where for instance five contact or storage wheels 45, 46, 48, 49, 50 present a notch 101 to an arresting pawl 103, excepting the contact wheel 47.

The bars 105 of the locking pawls 103 are constructed with different lengths. Besides, the notches 101 of the contact wheels 45–50 are displaced during the rotation or the latter angularly in respect to the shaft 38, in an effort to avoid blocking of the wheels 45–50 by the bars 105. In this manner, jamming or sticking of the mechanism is substantially avoided, despite the relatively small driving power of the motor 132. At the same time, there is eliminated the requirement of close tolerances, both during manufacture and assembly of the device.

The system of the storage or contact wheels 45–50 is coupled to the system of the counting wheels 39–44 through the running-up or coupling springs 112 previously described and connected to the individual contact wheels 45–50. Assuming that the arresting pawls 103 are in the raised position, each contact wheel 45–50 will be allowed to rotate freely until its spring 112 engages the pin 66 of the associated counting wheel 39–44. The latter is normally prevented from rotation by its associated feed or connecting pawl 69. After a contact wheel 45–50 has caught up with its associated counting wheel 39–44, it is braced against the latter and allowed to rotate only during rotation of the associated counting wheel, that is, the counting wheel and the associated contact wheel rotate in absolute phase synchronism.

After the arresting of the contact wheel system 45–50 by the arresting pawls 103, it is necessary that the counting wheels 39–44 are enabled to continue their rotation over any desired period in order to continue counting of the incoming pulses. In other words, the coupling pins 66, constituting the sole coupling means between the associated contact and counting wheels, should not impede the continued rotation of the counting wheels. This requirement is fulfilled by the relatively simple design of the springs 112 in cooperation with the pins 66, as shown more clearly by FIG. 20.

Assuming, for instance, the counting wheel 39 to be at rest, the spring 112 engages and runs up upon the pin 66, whereby to prevent the contact wheel 45 from further rotation. As a consequence, assuming the counting wheel 39 to rotate and the contact wheel 45 to be free or disengaged from its arresting pawl 170, both wheels will then rotate together. If now the wheel 45 is arrested and the wheel 39 continues its rotation, the pin 66 will be disengaged from the spring 112 so that the wheel 39 is allowed to rotate freely. The pin 66, upon again approaching, after rotating somewhat less than a complete revolution, the spring 112 yields in the axial direction, presses the latter against the wheel 45 and passes the spring substantially unimpeded thereby. After the pin has passed the spring 112, the latter snaps back to the position shown in the drawing. Aside from the negligibly small braking force during the passage of the pin 66 and compression of the spring 112, the counting wheel 39 is at any time free in its movement of rotation. In other words, the counting wheel system at any time represents the exact sum of the incoming pulses being counted, irrespective of whether the contact wheel system rotates, is at rest, or in the course of carrying out a synchronizing operation, in the manner described.

FIGS. 9 and 10 show the arresting pawl control mechanism both schematically and by end view, respectively. The control mechanism includes a common shaft 104 for all six arresting pawls 103 each of which is adapted to engage one of the ten notches 101 of the associated contact wheels 45–50. Rigidly connected with the arresting pawl shaft 104 are a number of levers 135–138. Cooperating with the lever 135 is the plunger 151 of an electromagnet or solenoid 150, while the lever 136 serves to operate a signaling contact 139 being fitted with three contact springs 154, 155 and 156. A relatively soft zero-position flat spring 141 acts, by way of the lever 137, upon the system, while the lever 138 is engaged by one end of a relatively strong tension spring 142. A mounting lug 157 being rotatively adjustable within predetermined limits and holding the end of spring 141 is fixed after proper adjustment, as is a displaceable mounting slide 143 adjustable within a few millimeters (see arrow 144) and serving to support the opposite end of the spring 142. In order to reduce the friction of the system to a minimum, the shaft 104 is supported at both its ends by means of precision ball bearings. For the same purpose, the ends of the springs 142 are mounted in such a manner as to enable, during rotation of the system about the axis 104, the hooked ends 145 and 146 of the spring 142 to move with a minimum of friction within the securing openings 147 and 148.

For the same reason, the plunger 151 of the solenoid 150, FIG. 9, is arranged to move freely between the forked-shaped ends (not shown) of the lever 135, in such a manner that with the magnet 150 in the energized condition the plunger 151 is completely disengaged from the lever 135. In the attracted or energized condition of the magnet 150, the friction involved is of no importance, inasmuch as the magnet 150 exerts a sufficiently strong pull on the system. The stop members 152 and 153 at the ends of the levers 136 and 137 advantageously consist of synthetic material, preferably "Delrin," whereby to result in small friction and to electrically isolate the lever 137 from the signaling contact 139.

As long as the magnet 150 is in energized condition, the arresting pawls 103 remain in the raised or disengaged position, corresponding to position *a*, FIG 19. FIG. 19 represents the various forces acting on the system as a function of the rotational angle or operating path of the pawls 103, respectively.

If the magnet 150 is de-energized, all the six pawls 103 should engage the wheels 45–50, that is, all said wheels should present a notch 101 to each pawl 103. Upon de-energization of the solenoid 150, the plunger 151 descends by virtue of its own weight and remains completely disengaged from the system until re-energized for the commencement of a new storage and coding operation. The forces controlling the operation of the pawls 103 are composed of the driving forces of the springs 141, 142 and 154 and the braking force of the spring 155. The friction of the system, as already pointed out, may be maintained within negligibly small limits. In order to safely overcome the resistance of the spring 155, it is necessary that the action by the springs 141, 142 substantially exceeds the action of spring 155.

Immediately upon the de-energization of the solenoid 150 (position *b*, FIG. 19), one of the pawls 103 may engage the periphery of one of the wheels 45–50, in which position the pawl will be acted upon by the forces exerted by the null-position spring 141 and the spring 142, while both the springs 154 and 155 are inactive in this position of the system by engaging or abutting against the central spring 156. In this position, it is necessary that the resultant of the effects of the springs 141, 142 causes the pawl 103 to positively engage, though with as small as possible a contact pressure, one of the contact wheels 45–50. Adjustment of the slide 143 as well as rotation of the mounting lug 157 makes this possible.

The following is a brief description of the operation of the device as disclosed and shown.

As pointed out hereinbefore, the six counting wheels 39–44 constitute an integral system or structure with the first wheel being advanced step-by-step by the input or counting magnet 130 through angles equal to one tenth of a revolution of the wheels. At the end of each revolution of the first wheel 39, the latter acts to advance the next wheel 40 one tenth of a revolution, and so forth for the next following wheels of the decade pulse counter. The pulses to be counted which may be supplied from a master counter and each of which represents, for instance, a unit of electrical energy, say one watt-hour, are applied to the winding of the magnet 130, whereas the sum of the pulses is represented by the position of the wheels 39–44. The position of the wheels 39–44 thus represents the instantaneous numerical value of the master counter or the like input device.

The contact wheels 45–50 constitute another six-stage decade system, in the example illustrated, by which the positions of the individual contact wheels are stored and converted electrically by the aid of the code plates 51–56 into digital signals which may be read out electronically, in a manner well known. During normal operation, the contact wheels 45–50 have the same position as the associated counting wheels 39–44, as they follow exactly the stepped movements of the latter in the way already described.

Upon receipt of a "read and report" order in the form of an electrical signal, the contact wheels 45–50 are arrested in their momentary positions by de-energization of the magnet 150. As long as the magnet 150 stays de-energized, this position is stored. Upon cessation of the "read and report" signal, the magnet 150 becomes again energized, whereby to free the contact wheels 45–50 and to allow the same to catch up or synchronize with the counting wheels within a relatively short time period. As a consequence, actuation of the counting wheels 39–44 by the incoming pulses to be counted is not interrupted during the periods of storage or arresting of the contact wheels 45–50. The counting wheels 39–44 represent, therefore, at any time the number of pulses being counted, or true position of the associated master counter.

The signalling contact 139 consists of two contact elements, viz a closed-circuit or resting contact and a free or open-circuit contact 163 and 164, respectively. The resting contact 163 is constituted by the contact springs 155 and 156 and remains closed in all positions of the system, excepting the position *d*. Spring 156 is connected to the neutral point of the electronic reading system of the encoder (not shown), thus dispensing with a special connecting lead. The spring 155 is connected with the internal electronic system and operates by switching a control potential to zero whenever the contact spring 155 engages the contact 156. In this manner, the respective primary encoder 2 is prevented from transmitting the information stored by it to the switching station of the respective substation 3, except when especially called for or ordered to effect a transmission.

The delay by the resting contact as described serves to prevent the reading out of faulty values during the synchronization process of the counting and storing wheels. The delay of the resting pawl operation utilizing a special retarding wheel, as described presently has the purpose to enable operation of the arresting pawls only after synchronization has been achieved securely and definitely. The fact that each of the decade wheels may rotate freely and has its own coupling means results in the synchronization to require a maximum of a single revolution of the wheels only.

The open-circuit contact 164 is constituted by the contact springs 154 and 156 and is opened in the position *a* only of the system. The spring 156 is advantageously connected to the zero point of the reading out circuit of the encoder and the spring 154 may be connected to the electronic circuit (not shown) of the substation. If there are more than a single primary encoder located close to each other, all the contact springs 154 may be connected in parallel, whereby *n* encoders will result in a parallel connection of *n* contacts 164. As a consequence, the single additional conductor, leading to the electronic circuit of the substation, will be connected to zero as long as a single one of the contacts 164 remains in the closed position. If all the magnets 150 of the primary encoders 2 of a substation are re-energized after termination of a reading, the contacts 164 of all the properly functioning primary encoders will be opened. In other words, under normal conditions the common signal conductor of the contacts 164 will no longer be at zero after energization of the magnets 150, except in the case if, despite the applied exciting voltage, a single one of the primary encoders fails to operate, such as due to the interruption of the exciting coil of the magnet, mechanical jamming, etc. The electronic system of the substation may be provided with means to ascertain this fault and to indicate the same by a warning signal. A similar signal may be transmitted to the central station, to prevent a renewed reading of the counter of the respective station, until the faulty primary encoder has been exchanged. This safety feature is of vital importance, since otherwise erroneous counter readings may be transmitted unnoticed. In order to enable the easy and ready determination of a blocked primary encoder out of a larger number of encoders, each encoder is fitted with an indicating pointer 167, FIG. 13, being visible from the outside and indicating the instantaneous position of the arresting pawl system.

A delayed operation of the arresting pawls is of vital importance to ensure the proper functioning of a primary encoder, especially where a larger number of groups of encoders is controlled from a common central station. The delaying mechanism as shown by the drawings consists essentially of a retarding wheel or disk 168, FIG. 4, and a double pawl 170, FIGS. 12 and 21, cooperating therewith, said pawl being rigidly connected with the arresting pawl system. The retarding disk 168 may be similar to one of the contact wheels 45–50, being provided with a single locking notch 171 only. Disk 168 is mounted upon the shaft 38 and driven by a coupling disk 172 which is in turn loosely mounted upon said shaft and driven through its own transmission gearing 173 by the synchronous motor 132. The speed of rotation of the coupling disk 172 is 0.9 time the speed of the shaft 38. In other words, disk 172 completes one revolution in 3.3 seconds, assuming the shaft 38 to revolve once in three seconds as pointed out. The retarding disk 168, in a manner similar to the wheels 39–50, is urged against the coupling disk 172 by a spring 175. Aside from the notch 171, the disk 168 is fitted with a stop pin 176 which is similar to the pin 66 of the counting wheels 39–44. The double pawl 170 is rigidly connected with the arresting pawl system and engages the notch 171 of the retarding disk 168 in the positions *e* and *d*, while on the other hand preventing continued rotation of the retarding disk 168 in the position *e* of the system. As long as the retarding disk 168 does not present its notch 171 to the pawl 170, the arresting pawl system is prevented from operation (position *b*). The function of the double pawl 170 will be described in greater detail in the following.

Upon energization of the magnet 150 the locking bar of the pawl 170 recedes from the notch 171 of the retarding disk 168 (position *a*), whereby the latter being driven by the coupling disk 172 is started to rotate at a speed which is 10% less than that of the remaining wheels 39–50. Assuming that the magnet 150 remains energized during a period in excess of a single revolution of the retarding disk 168, that is, longer than 3.3 seconds, the finger 177 of the double pawl 170 prevents the later to continue its rotation. If then at any subsequent time the magnet 150 is de-energized, the arresting pawl system will be enabled to operate instantly, provided the contact wheels 45–50 are in the proper position, since the retarding disk 168 having been arrested by the finger 177 of the pawl 170 in this position presents its notch 171 to the locking bar of the pawl 170. The finger 177 will allow the retarding disk 168 to continue to rotate until reaching the positions *c* and *d*, whereby it will again be arrested after a few degrees of rotation by the now engaged bar of the pawl 170.

Conditions are quite different where, upon energization of the magnet 150, the retarding disk again starts to rotate and the magnet 150 is de-energized before the retarding disk 168 is arrested by the finger 177 of the double pawl 170, as described in the foregoing, that is, before the retarding disk is enabled to carry out a complete revolution. In this case, the locking bar of the pawl 170 is displaced relative to the notch 171, whereby to slidably engage the periphery of the retarding disk 168 until completion of a revolution by the said disk, to enable operation of the pawl 170 and, in turn, of the entire locking pawl system. The delay system as described thus provides a maximum delay of about 3.3 seconds upon de-energization of the magnet 150 until enabling a renewed operation of the arresting pawl system. This delay does not, however, take place if 3.3 seconds or more have already elapsed after the last energization of the magnet 150, since under these conditions the arrested retarding disk 168 instantly presents its notch to the bar of the pawl 170.

There is no danger of insufficient time being available for the contact wheel to catch up or synchronize with the counting wheel, since the first counting wheel 39 in accordance with the assumption made advances at the most a single step in 1.2 seconds, while the contact wheel rotates by 3.3 steps per second. Conditions are ten times more favorable for the next stage, and so on for the following stages.

The most unfavorable condition for the synchronization will exist if the contact wheel system is arrested during a relatively long time period and if in the meantime anyone of the counting wheels, such as wheel 41, has been advanced by ten full steps by the incoming pulses and that, simultaneously, all the preceding counting wheels, that is, 39–40 according to the example, have assumed the counting positions nine. If at this instant the magnet 150 is energized and de-energized immediately thereafter and if, simultaneously, a counting pulse is applied to the magnet 130, the counting wheels 39 and 40 each pass through the nine-zero positions, thereby to advance the wheel 41 by one step. The contact wheel 47 has been in arrears in any case by ten steps and is compelled, by the additional step of the wheel 41, to carry out eleven steps until catching up with the wheel 41. For this operation the wheel requires 3.3 seconds, that is, just the time which is provided by the retarding disk 168, before the arresting pawl system will be enabled to operate.

In other words, the available time is sufficient under the most unfavorable conditions to ensure a perfect synchronism of the contact wheels 46–50. Somewhat less favorable conditions obtain in the case of the contact wheel 45. Here again the counting wheel 39 at the instant of energization and de-energization of the magnet 150 may have advanced beyond the contact wheel 45 by exactly ten steps. The maximum number of counting pulses directly effecting the counting wheel 39 is equal to one impulse during every 1.2 seconds, whereby a maximum of two pulses may arrive during the period of 3.3 seconds. As a consequence, the contact wheel 45 should advance by twelve steps until catching up with the counting wheel 39. It is, however, enabled to advance only eleven steps during the available time, resulting in a faulty reading by one pulse or count. However, this is of no import since the pulse is not lost and retained by the counting wheel system. In other words, the resulting synchronizing error, or error in the read out time $t_0$ remains substantially within the limits determined by the practical requirements. In the case of the second contact wheel 46 the error no longer exists. Each de-energization of the magnet 150 at the time $t_0$, that is, 3.3 seconds at the latest after a preceding energization, results in the instant operation of the arresting pawl system and a corresponding fixation of the position $k_0$. Where the minimum time required for the synchronization is not available normally, the latter will be enforced by the action of the retarding disk or wheel 168.

The counter reading at the time $t_0$ may be retained and stored indefinitely in the contact wheel system and may be read out electronically through the system of code plates, in the manner pointed out. An optical read out is also possible inasmuch as the positions of the contact wheels are indicated by the color code markings described.

In the foregoing the invention has been described in reference to a specific illustrative device. It will be evident, however, that variations and modifications, as well as the substitution of equivalent parts or elements for those shown for illustration, may be made without departing from the broader purview and spirit of the invention as defined by the appended claims. The specification and drawings are accordingly to be regarded in an illustrative rather than in a restrictive sense.

I claim:

1. A digital storage device comprising in combination:

(1) a pulse controlled multi-stage decade counting aggregate comprising a plurality of operably interconnected decade counting wheels representing a numerical digital value to be stored by the relative positions of said wheels, (2) an aggregate of notched storing wheels similar to said first aggregate, each storing wheel being coordinated to a correspinding decade counting wheel, (3) a continuously rotating drive shaft freely rotatively supporting both said counting and storing wheels alternately disposed along said shaft, (4) a plurality of friction coupling disks rigid with said shaft in mutually spaced relation to each other, each of said disks intervening between a pair of coordinated counting and storage wheels of the respective decades, (5) resilient means to maintain each of said disks in frictional coupling engagement with its coordinated counting and storage wheels, to enable independent rotation of said wheels by said shaft, (6) first locking means to normally arrest the first decade wheel of said counting aggregate and to intermittently release the same by the incoming pulses to be counted, (7) further coupling means between each of said storing wheels and its coordinated counting wheel effective in frictionally locking said wheels at a predetermined relative angular position, whereby to maintain said storing wheels in phase synchronism with their respective counting wheels, (8) a plurality of locking elements each adapted to engage the notches of one of said storing wheels, and (9) uni-control means to operate said locking elements between a position of disengagement from said storing wheels and a position of engagement with said storing wheels, to temporarily arrest said storing wheels for the storing of an instantaneous numerical value represented thereby, while allowing of continued rotation of and counting by said counting wheels.

2. In a digital storage device as claimed in claim 1, said further coupling means designed to provide a coupling force for said storing wheels being in excess of the coupling force provided by said disks.

3. In a digital storage device as claimed in claim 1, including a plurality of stationary spacing plates disposed between successive counting wheel, storing wheel and coupling disk assemblies.

4. In a digital storage device as claimed in claim 3, said resilient means consisting of coil compression springs encircling said shaft and intervening between said wheels and the adjacent spacing plates.

5. In a digital storage device as claimed in claim 1, including electrical contact means carried by said storing wheels on the side thereof opposite to the associated coupling disks, and a stationary code plate adjacent to and arranged to cooperate with the contact means of each storing wheel, to electrically encode the numeral values stored by said wheels.

6. In a digital storage device as claimed in claim 1, each of said counting wheels being provided with uniformly spaced peripheral notches, a plurality of cooperating feed pawls normally in engagement with said counting wheels, and means to intermittently release the pawl of the first counting wheel by the counting pulses, to step-by-step advance said wheel by said shaft.

7. In a diigtal storage device as claimed in claim 6, each of said counting wheels having a feed element adapted to engage the feed pawl of the next decade once during a complete revolution, to release the next following counting wheel and to effect the progressive carry transfer from the first decade to the following decades of said counting wheel aggregate.

8. In a digital storage device as claimed in claim 1, said coupling disks being fitted upon both sides with a plurality of projections frictionally engaging the adjacent faces of the coordinated counting and storing wheels, said projections being designed to cause the coupling force between said disks and the coordinated storing wheels to be in excess of the coupling force between said disks and the coordinated counting wheels.

9. In a digital storage device as claimed in claim 8, said projections having the form of coupling pins projecting from the opposite faces of said disks with the edge surfaces of said pins acting as friction coupling areas engaging the respective counting and storing wheels, and said pins being located upon circles concentric with said disks with the circle of the pins engaging said counting wheels having a lesser diameter than the circle of the pins engaging said storing wheels.

10. In a digital storage device as claimed in claim 1, each of said counting wheels being provided with uniformly spaced peripheral notches, cooperating feed pawls normally engaging the notches of said counting wheel, means to intermittently release the pawl of the first decade by the counting pulses, to stey-by-step advance said first wheel by said shaft, the peripheral notches of said storing wheels substantially conforming with the notches of said counting wheels, and said locking elements and unicontrol means consisting of a plurality of locking pawls each adapted to engage the notches of one of said storage wheels, a common control shaft carrying said locking pawls, resilient biasing means to urge said control shaft to a position of engagement of said pawls with the respective storing wheels, and a control electromagnet locking said control shaft in the disengaged position of said pawls in the energized condition, whereby to operate said pawls to engaged position with said storing wheels by the action of said biasing means upon de-energization of said magnet.

11. In a digital storage device as claimed in claim 10, said biasing means being comprised of a plurality of biasing springs arranged to cooperatively act upon said control shaft such as to provide a varying operating force upon said locking pawls as a function of the angular position of said control shaft, said force having an initial relatively low value being substantially constant over a predetermined fractional angular operating range during engagement of the periphery of a storage wheel by an associated locking pawl, said force subsequently increasing during the pawls entering the corresponding notches of the respective storing wheels, and said force finally decreasing upon reaching of the fully engaged position by said pawls with said storing wheels.

12. In a digital storage device as claimed in claim 10, including a retarding disk freely rotatively mounted upon said drive shaft and fitted with friction coupling means, to drive the same by said shaft, said retarding disk having a single peripheral notch and an abutment element adjacent to said notch, a double pawl upon said control shaft adapted to engage said notch and to cooperate with said element, said pawl engaging said notch in the energized condition of said magnet and becoming disengaged therefrom upon initiation of a locking operation upon de-energization of said magnet, whereby to start rotation of said retarding disk and to delay operation of said locking pawls until after a predetermined rotation of said retarding disk and stopping thereof by said element at a position of said double pawl facing said notch.

13. In a digital storage device as claimed in claim 10, including signaling contact means operably associated with said control shaft, to be controlled thereby in dependence upon the engagement with and disengagement, respectively, from said storing wheels, of said locking pawls.

14. In a digital storage device as claimed in claim 1, said further coupling means being comprised of a segmental coupling spring secured at one end to the face of the storing wheels, and a coupling pin extending from said counting wheels in a direction parallel to the axis of said wheel and adapted, during relative rotation of said wheels, to engage and lock the coupling spring of the coordinated storing wheels.

15. In a digital storage device as claimed in claim 12, said coupling springs designed to exhibit relatively great stiffness in both the tangential and radial direction, and to exhibit a relatively small stiffness and high resiliency in the axial direction of said storage wheels.

16. In a digital storage device as claimed in claim 1, a plurality of resilient contact springs secured to the face of said storing wheels opposite from the respective coupling disks, a plurality of stationary code plates each adjoining one of said storing wheels and carrying contact strips operatively engaging said contact springs, to electrically encode the stored information in the locked position of said storing wheels.

17. In a digital storage device as claimed in claim 1, said counting wheels provided with uniformly spaced peripheral notches, a plurality of cooperating feed pawls for each counting wheel normally engaging a notch of the respective counting wheel, means to intermittently release the feed pawl of the first counting wheel by the incoming pulses to be counted, to step-by-step advance said first wheel by said shaft, each of said counting wheels having a release element adapted to engage once during each revolution the feed pawl of the next decade wheel, whereby to step-by-step advance the next following wheels, said pawls consisting of magnetic material and having an extension adapted to be attracted by a permanent magnet from the outside of the device, to allow of individual release of the pawls of the counting wheels and manual adjustment of the counting aggregate.

18. A digital storage device comprising in combination:

(1) a pulse controlled multi-stage decade counting aggregate comprising a plurality of operably interconnected decade counting wheels representing a numerical value to be stored by the relative position of said wheels, (2) an aggregate of storing wheels similar to said first aggregate, each storing wheel being coordinated to a corresponding counting decade wheel, (3) a continuously rotating drive shaft freely rotatively supporting both said counting and storing wheels alternately disposed along said shaft, (4) a plurality of friction coupling disks rigid with said shaft in mutually spaced relation to each other, each of said disks intervening between a pair of coordinated counting and storing wheels of the respective decades, (5) resilient means to maintain each of said disks in frictional coupling engagement with its coordinated counting and storing wheels, to enable independent rotation of said wheels by said shaft, (6) first locking means to normally arrest the first decade wheel of said counting aggregate and to intermittently release the same by the incoming pulses to be counted, (7) further coupling means between each of said storing wheels and its coordinated counting wheel effective in frictionally locking said wheels at a predetermined relative angular position of said wheels, whereby to maintain said wheels in phase synchronism with each other, (8) and means to temporarily lock all said storage wheels, to store the instantaneous numerical value represented thereby, while allowing of continued rotation of and counting by said counting wheels substantially independently of the locking period by said storage wheels.

References Cited by the Examiner

UNITED STATES PATENTS

| | | | |
|---|---|---|---|
| 1,830,756 | 11/1931 | Ford | 235—144 |
| 2,207,743 | 7/1940 | Larson et al. | 235—133 |
| 2,344,254 | 3/1944 | Leathers et al. | 346—34 |
| 2,544,610 | 3/1951 | Nelson | 235—144 |

LOUIS J. CAPOZI, *Primary Examiner.*

LEO SMILOW, *Examiner.*